United States Patent [19]

Schaas

[11] 4,056,758
[45] Nov. 1, 1977

[54] LIGHT SPOT SUPPRESSION CIRCUIT FOR A CATHODE RAY TUBE

[76] Inventor: Gerhard Schaas, Near 27, 8633 Steinrod, Germany

[21] Appl. No.: 641,819

[22] Filed: Dec. 17, 1975

[30] Foreign Application Priority Data

Dec. 21, 1974 Germany .............................. 2460940

[51] Int. Cl.² ............................................. H01J 29/52
[52] U.S. Cl. .................................... 315/381; 315/384; 315/386
[58] Field of Search ................. 315/380, 381, 384, 386

[56] References Cited

U.S. PATENT DOCUMENTS

| 3,185,886 | 5/1965 | Leitich et al. | 315/381 |
| 3,426,240 | 2/1969 | Lester | 315/384 |
| 3,775,637 | 11/1973 | Brady | 315/386 |

Primary Examiner—Maynard R. Wilbur
Assistant Examiner—T. M. Blum

[57] ABSTRACT

An improved circuit for suppressing the occurrence of a sharply-focused light spot on the screen of a television receiver when the set is turned off is described. A normally conductive, controllable electronic switch is normally effective to maintain the brightness control grid of the cathode ray tube blocked, such switch assuming its non-conductive state only during the presence of the normal forward sweep portion of the deflection voltage to impart a positive step in voltage to the control grid to permit the now-moving light spot to be visible on the screen. During the flyback portion of the deflection voltage, or equivalently during the disabling of the TV set so that no forward sweep voltage is present, the controllable switch reverts to its "fail-safe" conductive condition to immediately restore the negative blocking voltage on the control grid to inhibit the beam current and thereby the formation of the now-stationary light spot.

10 Claims, 4 Drawing Figures

4,056,758

LIGHT SPOT SUPPRESSION CIRCUIT FOR A CATHODE RAY TUBE

BACKGROUND OF THE INVENTION

The invention relates to circuitry associated with a cathode ray tube for TV receivers and the like for selectively inhibiting the beam current in the tube when the forward sweep portion of the deflection voltage normally applied to such tube is absent.

In TV receivers and particularly those with thyristorinstrumented deflection circuits, there is present in the absence of suitable suppression circuitry a sharply focused light spot on the screen of the cathode ray tube when the forward sweep portion of the deflection voltage is absent, as when the TV set is turned off. This phenomenon is caused by the fact that, although the sweep voltages for the tube are in generally immediately disabled when the set is inactivated, the cathode of the picture tube continues to emit electrons toward the screen for a short time thereafter. Since, because of the large capacitors associated with the high tube potential, such high voltage does not decay immediately, a stationary light spot is formed on the screen unless a suitable negative blocking potential is immediately applied to the brightness control grid by a suppression circuit.

Presently known suppression circuits of this type generate the required negative blocking voltage directly or indirectly from an operating voltage of the TV set which ideally collapses immediately when the set is disabled. Their common disadvantages is that their effectiveness is directly dependent on the rate of decay or collapse of the associated operating voltage, so that particularly in those sets having semiconductor deflection circuits wherein the moving light spot becomes stationary immediately upon set turn-off, the above-mentioned operating voltage decays too slowly to provide an effective inhibiting signal.

SUMMARY OF THE INVENTION

Such disadvantages are overcome by the light spot suppression circuit of the invention. In an illustrative embodiment, a normally conductive, controllable electronic switch such as a transistor is coupled to a positive voltage source and to a first serial path including a capacitor and a diode which is poled to present a low impedance to the positive voltage source. Such serial path is connected to the blocking control grid of the cathode ray tube, so that while the switch is conductive a negative voltage referred to the tube ground is applied to the control grid. Such switch remains conductive during the flyback portion of the deflection voltage and also while the set is or becomes inoperative.

During the occurrence of the forward sweep portion of the deflection voltage when the light spot on the tube screen in moving, the transistor switch is rendered non-conductive to impart a positive step in voltage to the tap point of the first serial path, such jump being sufficient to remove the inhibiting effect of the control electrode on the beam current and thereby to permit the now-moving light spot to be visible on the screen. Upon the subsequent termination for any reason of such forward sweep portion, the switch reverts to its conductive state to restore the original reference for the tap-off point, and the original negative potential is restored on the control grid of the tube to blank out the now-stationary spot.

Such "fail-safe" operation of the control grid avoids the problems of positively generating the required negative voltage from a collapsing operating voltage, as was the case in prior art arrangements; since the set is normally urged toward its blocking condition, the tube beam current is inhibited immediately upon the disappearance of the forward sweep voltage. Additionally, since the set is automatically blanked during the occurrence of the flyback portion of the sweep voltage, no separate circuitry is necessary as in ordinary designs, for blanking the tube screen during flyback. Such separate facilities have heretofore been necessary in certain receiver designs, e.g., those in which the deflection voltage is tapped off the secondary side of an isolating transformer.

The required voltage for gating the switching transistor into its non-conductive state during the forward sweep may be applied directly to the base of such switching transistor, or alternatively may be applied to a second, normally non-conducting transistor of the same conductivity type whose collector-emitter path is connected across the base-emitter path of the first switching transistor.

For added reliability, the circuit input may be adapted to be triggered only upon the exceeding, by the forward sweep voltage, of a predetermined threshold value. For this purpose, a suitably biased zener diode may be included in the input circuit, or alternatively the emitter of the switching transistor, and additionally the emitter of the second, normally non-conductive transistor if one is used, are returned to a definite non-ground potential to establish the required threshold value.

BRIEF DESCRIPTION OF THE DRAWING

The invention is further set forth in the following detailed description taken in conjunction with the appended drawing, in which.

DETAILED DESCRIPTION

Figure 1:
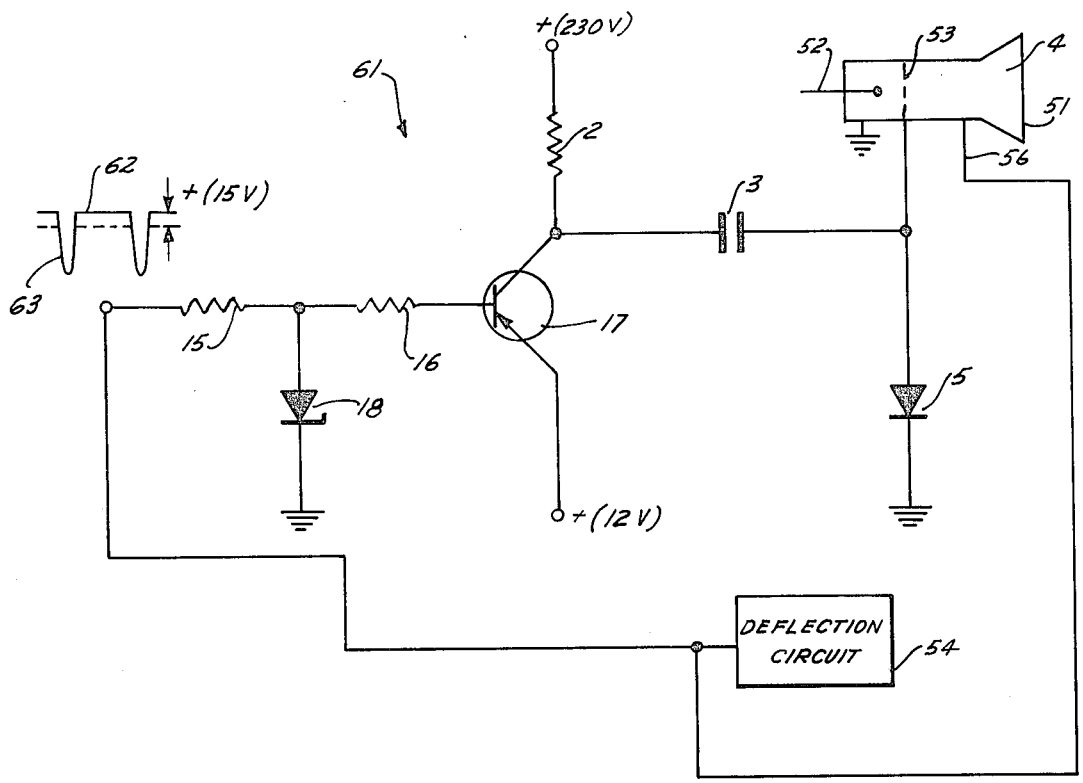
FIG. 1 is a combined block and schematic diagram of a first arrangement in accordance with the invention and employing a single transistor of a prescribed conductivity type for suppressing a stationary light spot on a cathode ray tube screen.

Referring now to the drawing, FIG. 1 illustrates a conventional cathode ray tube 4 of a TV receiver and the like which exhibits a light spot as a result of electrons incident thereon from a tube cathode 52 when a brightness control grid 53 of the tube is subjected to a non-negative potential. The light spot on the screen 51 is conventionally swept to form the horizontal portion of the TV raster by means of a deflection voltage appearing on the output of a deflection circuit represented generally at 54. As shown, the output of the circuit 54 is applied to a deflection input of the tube 4, such deflection input being represented at 56. Such voltage is also applied to the input of a light spot suppression circuit 61, whose structure and operation in accordance with the invention is described below.

The deflection voltage, which illustratively is tapped off a transformer (not shown) of the deflection circuit 54, conventionally exhibits a forward sweep portion 62 and a fly-back portion 63. In the arrangement of FIG. 1, the forward portion 62 is a positive quantity having a magnitude of 15 volts with respect to the ground of the tube 4. In accordance with the invention, the circuit 61 is arranged to apply, to the control grid 53 of the tube 4, a negative blocking potential to suppress beam current in the tube and thereby the light spot on the screen 51, whenever the voltage applied to the input of the circuit 61 from the deflection circuit 54 falls below a threshold value indicative of the occurrence of the forward sweep portion 62. In other words, the circuit 61 is arranged to maintain a "fail-safe" negative voltage on the control grid 53 whenever the forward sweep portion 62 is absent, whether such absence be exhibited by the occurrence of the flyback portion 63 of the deflection voltage or the disabling of the associated TV receiver, as exhibited by the cutout of the deflection circuit 54 and the resultant stationary positioning of the spot on the screen 51. Thus, although the cathode 52 of the tube 4 will continue to emit electrons for a finite time after the deflection circuit is disabled, the normal negative voltage automatically restored to the control grid 53 will prevent such electrons from hitting the screen 4 and will thereby provide the required light spot suppression effect.

In addition, the normally required separate suppression circuit coupled to the output of the transformer of the deflection circuit 54 for blanking the screen 51 during the occurrence of the flyback pulses 63 is no longer required, since the circuit 61 performs this function as well.

In the arrangement of FIG. 1, the circuit 51 includes a PNP switching transistor 17 whose collector is coupled via a charging resistor 2 to a positive voltage source and whose emitter is returned to a source of positive potential whose magnitude establishes the threshold switching level of the transistor 17 and which is slightly below the normal amplitude of the forward sweep portion 62. The base of the transistor 17 is coupled, via a pair of serial resistors 15 and 16, to the output of the deflection circuit 54. A zener diode 18 is connected between the junction of the resistors 15 and 16 for current-limiting purposes.

A serial path including a capacitor 3 and a diode 5 are connected between the collector of the switching transistor 17 and ground. The diode 5 is poled in its low-impedance direction relative to the polarity of the positive voltage source that supplies the collector voltage to the transistor 17. The junction of the capacitor 3 and the diode 5 is connected to the control grid 53 of the tube 4.

With such arrangement, when the voltage applied to the input of the circuit 61 is below the threshold value represented by the reference potential on the emitter of the transistor 17 (i.e., when the deflection voltage exhibits a value lower than +12 volts and thereby a condition indicative of either the occurrence of the flyback portion 63 or the inoperativeness of the deflection circuit), the switching transistor 17 will be in its normal conductive state. Under such conditions, the voltage at the collector terminal of the transistor 17 will assume the potential of the emitter thereof, i.e., +12 volts. Moreover, the voltage across the capacitor 3, which upon the turn-on of the receiver will initially be charged up to the 230 volt collector supply through the resistor 2 and the diode 5, will thereafter exhibit such voltage since the diode 5 will remain non-conductive to hold the control grid 53 off ground; accordingly, no discharge path will be provided for the capacitor 3. Since as a result the voltage at the collector of the transistor 17 when the latter normally conducts will exhibit approximately the +12 volt value representing the threshold voltage at its emitter, and since the capacitor 3 exhibits a 230 volt drop thereacross, the voltage on the right-hand terminal of the capacitor 3 relative to ground will be a very high negative value during the conduction period of the transistor 17. Accordingly, the beam current and thereby the light spot of the tube 4 will be cut off.

During each forward sweep interval 62, however, when the deflection voltage exhibits a positive jump over the 12 volt threshold at the emitter of the transistor 17, such transistor will be driven into its non-conductive state and the voltage at its collector will rise from +12 volts to approximately 230 volts. As a result, the voltage at the right-hand terminal of the capacitor 3, when referred to ground, will exhibit a large positive jump to approximately ground potential, thereby permitting the passage therethrough of the electrons emitted from the cathode 52. Therefore, the now-moving light spot will be visible on the screen 51 to define the desired TV picture.

When the deflection voltage again drops below its threshold, either at the start of the flyback interval or when the deflection circuit becomes disabled, the transistor 17 will again be driven into its conductive state, whereby the voltage at its collector, and thereby on the right-hand terminal of the capacitor 3, will undergo a sharp negative drop to restore the grid 53 to its normal negative voltage condition, and the light spot on the screen 51 will be inhibited as desired.

Figure 2:
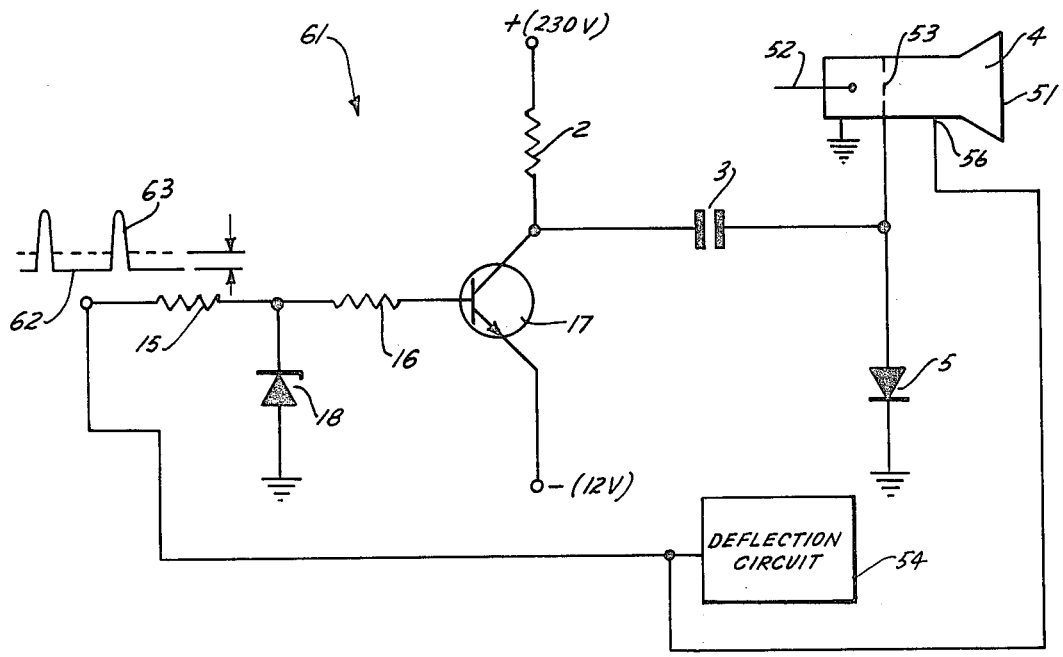
FIG. 2 is a combined block and schematic diagram of a modification of the arrangement of FIG. 1 wherein the transistor is of opposite conductivity type.

The arrangement of FIG. 2 is similar to that of FIG. 1, but is arranged to operate when the forward sweep portion of the deflection voltage is negative as shown. The respective components of FIGS. 1 and 2 are the same, except that the polarity of the zener diode 18 has been reversed, and the switching transistor is embodied as an NPN device 12 whose emitter is returned to a negative potential (i.e., −12 volts) slightly lower than the normal negative voltage of the forward sweep portion of the deflection voltage. The function of the arrangement of FIG. 2 is to maintain the switching transistor 12 conductive so long as the voltage applied to the input of the circuit 61 is more positive than the −12 volt threshold level, i.e. during the occurrence of the flyback pulse 63 or during the times when the deflection circuit 54 is inoperative. Under these circumstances, a highly negative voltage is applied to the control grid 53 and the now-stationary light spot will be suppressed. When the deflection voltage goes more negative than the −12 volt threshold level (i.e., during the forward sweep interval), the transistor 12 is driven into its non-conductive state to gate the tube 4 on and to render the now-moving light spot visible on the screen 51.

Figure 3:
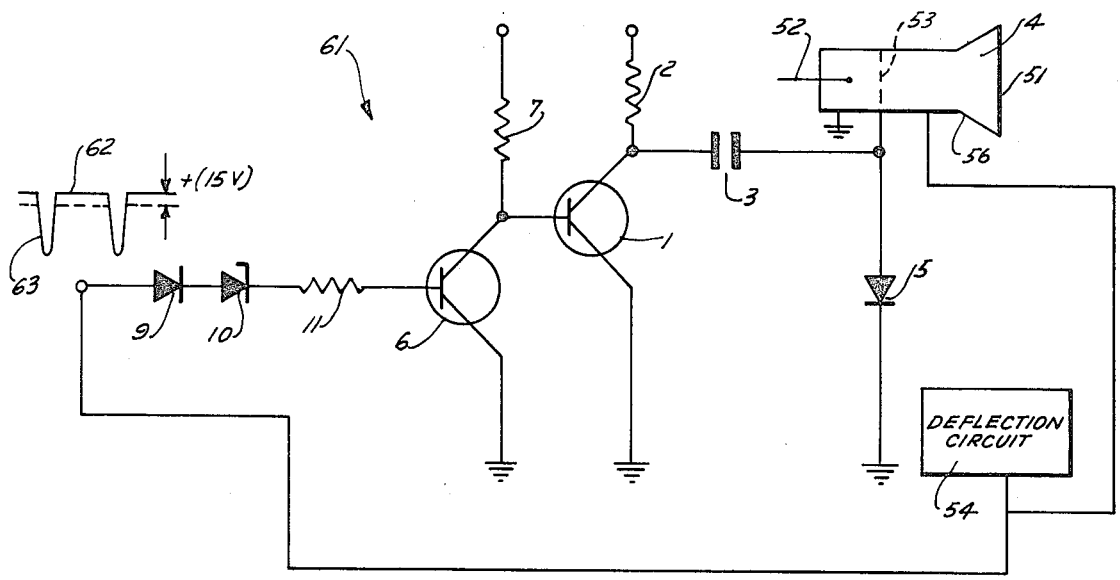
FIG. 3 is a combined block and schematic diagram of another embodiment of suppression circuit in accordance with the invention, employing a pair of cascaded switching transistors whose emitters are returned to ground.

In the arrangement of FIG. 3, the base of the switching transistor 1 is not directly excited by the deflection voltage, but instead is coupled to the collector of a second, normally non-conductive transistor 6 of the same NPN conductivity type as the transistor 1. The emitter of the transistor 6 is coupled to ground, and the junction of its collector and the base of the transistor 1 is returned through a resistor 7 to a positive voltage supply.

The deflection voltage, whose forward sweep portion 62 is assumed to exhibit a positive voltage as shown, is applied through a decoupling diode 9, a zener diode 10 which is suitably biased to a reference potential by means not shown, and a resistor 11 to the base of the transistor 6.

In the arrangement of FIG. 3, during the absence of the forward sweep portion 62 the transistor 6 will be nonconductive, and the high positive potential of the collector supply of the transistor 6 will be applied to the base of the transistor 1 to maintain such transistor in a conductive state. As explained above in connection with FIG. 1, such conduction of the main switching transistor will cause the right-hand terminal of the capacitor 3 to exhibit a large negative potential with respect to ground, such potential being applied to the control electrode 53 to inhibit the occurrence of a light spot on the tube screen 51. At the start of the forward sweep portion of the deflection voltage, the transistor 6 will be driven into conduction, and the resulting reduction in the potential at its collector will cause the transistor 1 to be driven into its non-conductive state. The collector potential of the transistor 1, and thereby the potential at the right-hand terminal of the capacitor 3, will thereby undergo a sharp positive step, which will remove the inhibiting effect of the electrode 53 on the beam current and will permit the formation on the screen 51 of the now-moving light spot. When the forward sweep portion terminates, the transistor 6 will again be non-conductive, the transistor 1 will again be conductive, and the voltage on the grid 53 will be returned to its normal inhibiting negative value.

Figure 4:
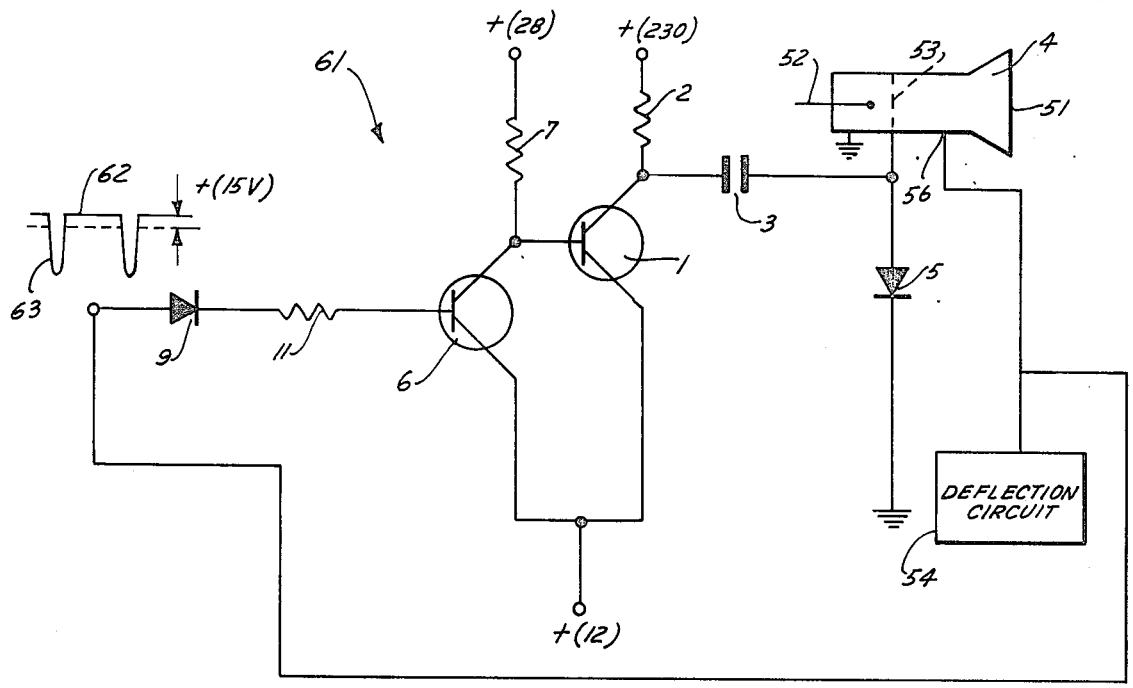
FIG. 4 is a combined block and schematic diagram of a circuit similar to that of FIG. 3 but having a pair of switching transistors whose emitters are returned to a definite potential off ground.

In the arrangement of FIG. 4, the emitters of the transistors 1 and 6 are returned to a positive potential rather than to ground, so that the zener diode in the base path of the transistor 6 can be dispensed with. In all other respects, the structure and function of the arrangement of FIGS. 3 and 4 are identical.

In the foregoing, several embodiments of the invention have been described. Many variations and modifications will now occur to those skilled in the art. It is accordingly desired that the scope of the appended claims not be limited to the specific disclosure herein contained.

What is claimed is:

1. In a cathode ray tube operable with a deflection voltage having a first forward sweep portion and a second flyback portion, a circuit for selectively inhibiting beam current in the tube when the first sweep portion is absent, the inhibiting means comprising, in combination, a first transistor connectable to a positive voltage source, a first serial path comprising a capacitor and a diode coupled to the first transistor, and means connecting the first serial path to the brightness control grid of the tube, the improvement in which the first transistor is normally maintained in a conductive state in the absence of the forward sweep portion of the deflection voltage; in which the first serial path is connected across the first transistor with the diode poled in the low impedance direction relative to the positive voltage of the source for normally establishing a high negative voltage at the first junction of the capacitor and the diode while the first transistor remains in its conductive condition; in which the connecting means comprises means for applying the voltage at the first junction to the brightness control grid of the tube whereby the high negative voltage normally at the first junction will inhibit beam current in the tube while the first transistor remains conductive; and in which the circuit further comprises means coupled to the base of the first transistor and responsive to the first sweep portion of the deflection voltage for positively switching the first transistor into a non-conductive state during the first sweep portion to impart to the first junction, and thereby to the brightness control grid of the tube, a positive step in voltage sufficient to permit the flow of beam current in the tube.

2. A circuit as defined in claim 1, in which the collector of the first transistor is coupled to the positive voltage source, and the emitter of the first transistor is coupled to a first reference potential.

3. A circuit as defined in claim 2, in which the first serial path is connected between the collector of the first transistor and a second reference potential.

4. A circuit as defined in claim 3, in which the first and second reference potentials are zero.

5. A circuit as defined in claim 3, in which the first sweep portion is a positive voltage, the first transistor is of NPN type, the first reference potential is a positive voltage smaller in magnitude than the positive voltage of the first sweep portion, and the second reference potential is zero.

6. A circuit as defined in claim 3, in which the first forward sweep portion is a negative voltage, the first transistor is of PNP type, the first reference potential is a negative voltage smaller in magnitude than the negative voltage of the first sweep portion, and the second reference potential is zero.

7. A circuit as defined in claim 3, in which the switching means comprises means for applying the deflection voltage to the base of the first transistor.

8. A circuit as defined in claim 3, in which the switching means comprises, in combination, a second normally non-conductive transistor, means for coupling the emitter of the second transistor to the first reference potential, means for connecting the collector of the second transistor to a positive voltage source and to the base of the first transistor to maintain the first transistor conductive while the second transistor is non-conductive and to switch the first transistor into its non-conductive state when the second transistor is rendered conductive, and means applying the deflection voltage to the base of the second transistor for switching the second transistor into conduction upon the occurrence of the first sweep portion.

9. A circuit as defined in claim 8, in which the first and second reference potentials are zero.

10. A circuit as defined in claim 8, in which the first sweep portion is a positive voltage, the first and second transistors are of NPN type, the first reference potential is a positive voltage smaller in magnitude than the positive voltage of the first sweep portion, and the second reference potential is zero.

* * * * *